July 3, 1956  S. B. PICKLES ET AL  2,753,555
OMNI DIRECTION RADIO RANGE SYSTEM
Filed March 14, 1951
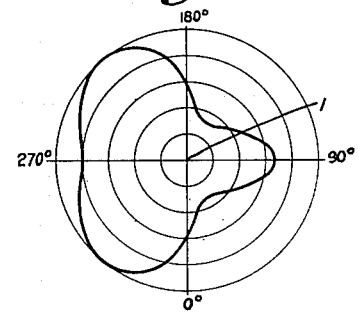
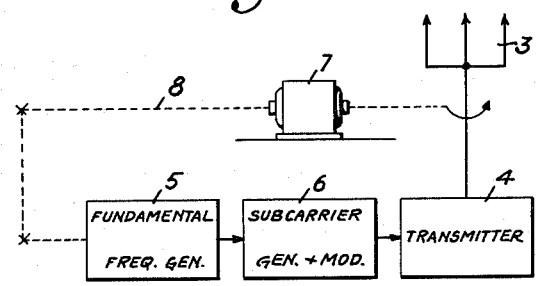
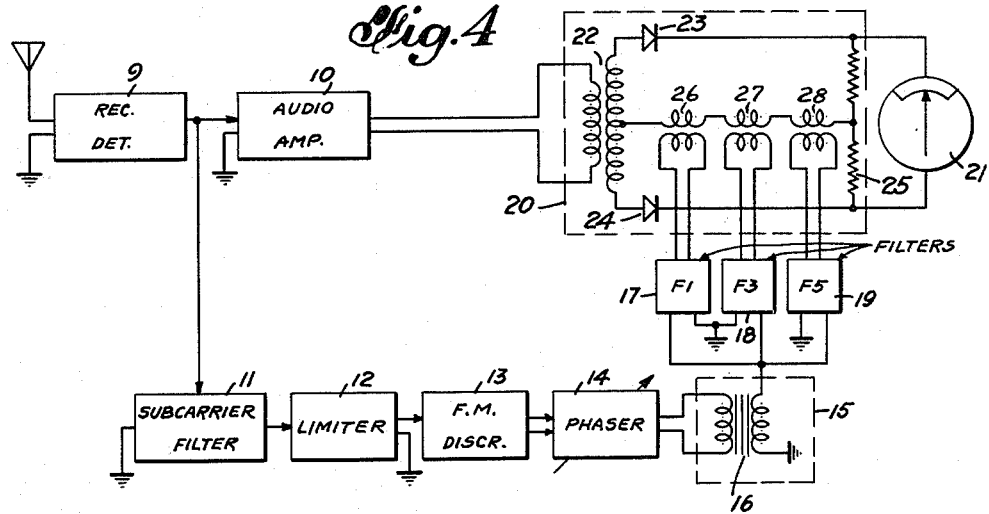
INVENTORS
SIDNEY B. PICKLES
GUS STAVIS
BY
ATTORNEY United States Patent Office 2,753,555
Patented July 3, 1956

2,753,555

OMNI DIRECTION RADIO RANGE SYSTEM

Sidney B. Pickles, Tarrytown, and Gus Stavis, Ossining, N. Y., assignors to International Telephone and Telegraph Corporation, a corporation of Maryland Application March 14, 1951, Serial No. 215,538

9 Claims. (Cl. 343—106)

This invention relates to omnidirectional radio ranges and more particularly to radio range systems of the phase comparision type which call for a comparatively sharp course indication.

In the copending application of S. Pickles, Serial No. 215,537, filed November 14, 1951, under the title of Omnidirectional Radio Range System, now Patent No. 2,715,727 issued August 16, 1955, there has been disclosed a radio range of the phase comparison type. This type of beacon depends upon comparison of the phase of a bearing signal derived by rotation of a directive radiation pattern with reference signal having a fixed phase relation with the bearing signal in a particular reference direction. The above application involves the transmission of rotatable bearing and fixed phase reference signals each containing odd order harmonic components from a beacon and the separate detection of these two signals at the receiver, where their relative phase is determined for the purpose of obtaining a course indication, as on an aircraft approaching or passing an airport. The rotatable bearing signal has such a pattern that the fundamental and harmonic bearing signals are derived at the receiver with a time phase dependent upon the relative bearing of the beacon and receiver. According to the above disclosure the fundamental and harmonics of the reference signal are generated in the ground or transmitter equipment and are transmitted on separate sub-carriers. This naturally involves the provision of a sufficient number of sub-carrier sources at the transmitter, as well as separate filters azimuth selectors for each of the fundamental and harmonic frequencies segregated out at the receiver.

It is an object of the present invention to provide a simplified radio range system of the above described type which while possessing the advantages of a range utilizing odd harmonics in the bearing and reference signals eliminates the requirement for more than one sub-carrier frequency and the attendant apparatus at the transmitter and receiver, by transmitting only the fundamental reference signal, and generating the harmonic reference signals at the receiver.

In accordance with certain features of the invention, we provide a radio range transmitter which transmits radio frequency energy in the form of a rotatable signal pattern to derive a bearing wave of a fundamental and a given number of odd harmonic frequencies upon which is impressed a reference signal corresponding to the fundamental frequency only, while the receiver includes provisions for detecting the bearing signal due to the complex radiation pattern and the means for generating the reference signal harmonics from the received fundamental reference wave for comparison with the bearing wave.

The above-mentioned and other features and objects of this invention will become more apparent, and the invention itself, though not necessarily defined by the said features and objects, will be best understood by reference to the following description of an embodiment of the invention taken in connection with the accompanying drawings wherein:

Fig. 1 is a schematic representation of a radio range;
Fig. 2 is a graphical representation of typical radiation pattern for a range in accordance with the present invention;
Fig. 3 is a diagram in block form illustrating a circuit arrangement of the transmitter of a radio range in accordance with the invention; and
Fig. 4 is a diagram in block form of a receiver for the range.

In accordance with Fig. 1, the omni-directional range generally comprises a transmitting station symbolically represented by an antenna tower shown at 1, which sends out a pre-determined rotating radiation pattern, preferably in a form as shown in Fig. 2. This radiation pattern is picked up by an observer such as provided on an aircraft in flight as shown at 2.

The transmitter shown in more detail in Fig. 3 comprises an antenna system 3 to which is supplied from a transmitter 4 a typical carrier frequency, for instance, comprising 1000 mc. The transmitter is modulated in accordance with the example shown by a reference signal, as provided by a reference signal generator 5, for instance, providing a 90 cycle wave which is utilized for frequency modulating a sub-carrier, as for example of 100 K. C., supplied from sub-carrier generator 6. The modulated sub-carrier is applied to modulate the radio frequency carrier of transmitter 4. The reference signal impressed on the transmission carrier fequency is transmitted to all receivers regardless of their locations in space as will be evident from the pattern shown in Fig. 2.

In order to obtain synchronism the rotation of the radiation pattern and the reference signal, the antenna system 3, is shown mechanically rotated by a motor 7 which through mechanical linkage 8 also drives the reference signal generator 5. The motor 7 will drive the antenna assembly at a speed sufficient to generate the fundamental frequency by rotation of the pattern 5400 R. P. M. for a 90 cycle per second reference wave. Thus the energy transmitted from antenna 3 comprises a multi-lobe radiation pattern, as shown in Fig. 2, due to the amplitude modulation of the carrier energy by the modulated subcarrier energy. This multilobe radiation pattern is rotated at the fundamental frequency due to the mechanical rotation of antenna 3 by motor 7.

The receiver circuit, as, for instance provided on an observer air aircraft as shown in Figure 4, preferably includes a receiving antenna and the usual intermediate frequency converter and detector circuits shown in the block 9. The output of the circuit 9 will be a signal containing amplitude variations due to the rotation of the multilobe transmitter antenna pattern for the purpose of supplying bearing information. The audio signal is obtained from a suitably tuned detector and audio amplifier 10. The output of circuit 9 also contains the reference signal sub-carrier, carrying, in accordance with the present example, a reference signal component as frequency modulation. After selection by filter 11 and the elimination of amplitude variations in the limiter circuit 12, the reference signal is detected in a frequency discriminator 13, a simple 90 cycle sine wave being obtained therefrom for the reference signal. The resultant sine wave is applied to an adjustable phaser 14 so that its phase my be adjusted to the desired relation to the bearing signal for course selection. The output of phaser 14 is applied to a distorter circuit 15, illustrated in this simple case as a saturated transformer 16. The distorter circuit 15 may comprise any one of well known circuits which serve to introduce harmonic frequencies into a sinusoidal input. The output of circuit 15 is applied to respective filter circuits 17, 18, 19 where the fundamental reference frequency F1 and odd order harmonics, up to the 5th, F3 and F5, are segregated and then applied to a phase comparison circuit 20. Use of frequencies F1, F3, F5 prevent comparison of even harmonics which may be generated by the antenna. It is in this circuit that the phase of the bearing and the reference signals are compared and the difference indicated given to the observer on the zero center indicator 21. By adjusting the phaser the selector 14 to bring the indicator back to its zero an indication of the departure from course travelled in respect to the true course may be obtained. The bearing signal wave may be applied over transformer 22 and rectifiers 23, 24, to load resistor 25. The reference wave fundamental and harmonics are applied over transformers 26, 27 and 28 to the phase discriminator to provide the required phase comparison.

Any well known form of distorter circuit may be used to produce the various reference signal harmonics. Thus, for example, the distorting circuit may comprise a clipper or wave limiter, a multivibrator type circuit or a single saturable core transformer device.

While we have described above the principles of our invention in connection with specific apparatus, it is to be clearly understood that this description is made only by way of example and not as a limitation to the scope of our invention, as set forth in the objects thereof.

What is claimed:

1. A receiver for use with a beacon system which produces by rotation of a radiation pattern a variation in amplitude corresponding to a fundamental and harmonic frequencies providing a bearing signal, and modulated with a reference frequency signal of said fundamental frequency, comprising means for separating said bearing signal and said reference signal, means responsive to said separate reference signal for producing reference harmonic frequencies waves corresponding with said bearing harmonic frequencies, and a directional indicator responsive to phase differences of said reference frequencies and said bearing signal frequencies.

2. A receiver according to claim 1 wherein said means responsive to said separated reference signal comprises means for distorting said separated reference signal.

3. A receiver according to claim 2 further comprising separate filters for separating said fundamental and the harmonic frequency components from said distorted reference signal.

4. A radio beacon system comprising an antenna system for producing a directive radiation pattern, means for rotating said pattern, whereby at a fixed point in time said pattern will produce bearing signal indications varying in accordance with a fundamental frequency and odd harmonics of said frequency, means for modulating energy radiated from said antenna system with a reference wave signal of said fundamental frequency, means for receiving radiated energy from said beacon, means for selecting separately said bearing signal and said reference signal, means responsive to said separated reference signal for producing reference signal component frequencies corresponding to said harmonic frequencies, and means for comparing the phase of said bearing signal frequencies and said reference signal components to derive a directional indication.

5. A radio beacon system according to claim 4, said means for modulating comprises a sub-carrier source, means for frequency modulating energy from said source, and means for applying said frequency modulated energy to modulate said radiated energy.

6. A radio beacon system according to claim 5, wherein said means for selecting comprises a receiver detector, an audio amplifier for said detected waves to provide said reference waves, a sub-carrier filter and a frequency discriminator coupled to said filter.

7. A radio beacon according to claim 6 wherein said means responsive to said separated reference signal comprises a distorting circuit coupled to the output of said frequency discriminator.

8. A radio beacon according to claim 7, further comprising separate fundamental and harmonic filters coupled to the output of said distorting circuit.

9. A radio beacon system according to claim 8 further comprising an adjustable phaser coupled between said frequency discriminator and said distorting network.

References Cited in the file of this patent

UNITED STATES PATENTS

| | | |
|---|---|---|
| 2,252,699 | Byrne | Aug. 19, 1941 |
| 2,422,110 | Luck | June 10, 1947 |
| 2,484,824 | Hansel | Oct. 18, 1949 |
| 2,513,493 | Kliever | July 4, 1950 |
| 2,551,828 | De Fremery | May 8, 1951 |